US010794926B2

(12) United States Patent
Margaritova et al.

(10) Patent No.: US 10,794,926 B2
(45) Date of Patent: Oct. 6, 2020

(54) RADIATION DETECTION APPARATUS AND METHOD

(71) Applicant: SENSONICA LIMITED, Nicosia (CY)

(72) Inventors: Oxana Margaritova, Toscolano-Maderno (IT); Andrey Khodkin, Moscow (RU)

(73) Assignee: SENSONICA LIMITED, Nicosia (CY)

( * ) Notice: Subject to any disclaimer, the term of this patent is extended or adjusted under 35 U.S.C. 154(b) by 0 days.

(21) Appl. No.: 16/195,326

(22) Filed: Nov. 19, 2018

(65) Prior Publication Data

US 2019/0154849 A1     May 23, 2019

(30) Foreign Application Priority Data

Nov. 19, 2017 (EP) .................... 17202468

(51) Int. Cl.
| | |
|---|---|
| *G01N 37/00* | (2006.01) |
| *G01S 3/04* | (2006.01) |
| *G01T 1/20* | (2006.01) |
| *G01S 3/782* | (2006.01) |
| *G01T 1/29* | (2006.01) |
| *G01C 1/02* | (2006.01) |
| *G01T 1/11* | (2006.01) |
| *G01N 21/71* | (2006.01) |
| *G01T 1/208* | (2006.01) |
| *G01T 3/06* | (2006.01) |
| *G01N 21/64* | (2006.01) |
| *G21F 3/00* | (2006.01) |

(52) U.S. Cl.
CPC ............. *G01N 37/005* (2013.01); *G01C 1/02* (2013.01); *G01N 21/64* (2013.01); *G01N 21/71* (2013.01); *G01S 3/043* (2013.01); *G01S 3/782* (2013.01); *G01T 1/11* (2013.01); *G01T 1/20* (2013.01); *G01T 1/208* (2013.01); *G01T 1/2018* (2013.01); *G01T 1/2907* (2013.01); *G01T 3/06* (2013.01); *G21F 3/00* (2013.01)

(58) Field of Classification Search
CPC ....... G01N 21/64; G01N 21/71; G01N 37/005
See application file for complete search history.

(56) References Cited

U.S. PATENT DOCUMENTS

| | | | |
|---|---|---|---|
| 3,539,806 | A | 11/1970 | Humphrey |
| 3,839,639 | A | 10/1974 | Hughes |
| 5,658,673 | A | 8/1997 | Holwitt et al. |

(Continued)

FOREIGN PATENT DOCUMENTS

| | | |
|---|---|---|
| GB | 2440588 | 2/2008 |
| WO | 2015038861 | 3/2015 |

OTHER PUBLICATIONS

Yüksel, Mehmet. (2013). Doğal ve Katkilanmiş Bor Minerallerinin Dozimetre Geliştirmek Amaciyla Termolüminesans (TL) Yöntemi Kullanilarak Çalişilmasi (Türkçe) Investigating Natural and Doped Boron Minerals Using Thermoluminescence (TL) Method for the Purpose of Development of a Dosimeter (English). (Year: 2013).*

(Continued)

*Primary Examiner* — Hugh Maupin
(74) *Attorney, Agent, or Firm* — Hanley, Flight & Zimmerman, LLC

(57) ABSTRACT

Radiation detection arrangement and method for detection of external radiation using TADF material.

16 Claims, 7 Drawing Sheets

(56) References Cited

U.S. PATENT DOCUMENTS

| | | | |
|---|---|---|---|
| 10,527,639 | B2 | 1/2020 | Margaritova et al. |
| 2006/0214113 | A1* | 9/2006 | Kleinerman ............... G01J 5/00 250/458.1 |
| 2012/0203086 | A1 | 8/2012 | Rorabaugh et al. |
| 2014/0034930 | A1 | 2/2014 | Seo et al. |
| 2015/0076360 | A1 | 3/2015 | Menge |
| 2016/0172605 | A1 | 6/2016 | Seo et al. |
| 2016/0178542 | A1* | 6/2016 | Lingren ................. G01N 23/09 250/363.01 |
| 2016/0197282 | A1 | 7/2016 | Tanimoto et al. |
| 2016/0268516 | A1 | 9/2016 | Tanaka et al. |
| 2017/0067828 | A9* | 3/2017 | Geddes ................ C09K 11/025 |
| 2017/0133617 | A1 | 5/2017 | Seo et al. |
| 2017/0162817 | A1 | 6/2017 | Ogiwara et al. |
| 2017/0229670 | A1 | 8/2017 | Laitar et al. |
| 2017/0256733 | A1 | 9/2017 | Tsukamoto et al. |
| 2017/0271597 | A1 | 9/2017 | Miyata et al. |
| 2017/0284940 | A1 | 10/2017 | Butte et al. |
| 2018/0226600 | A1 | 8/2018 | Seo et al. |
| 2018/0323396 | A1 | 11/2018 | Tsukamoto et al. |
| 2018/0337360 | A1 | 11/2018 | Huang et al. |
| 2019/0067615 | A1 | 2/2019 | Seo et al. |
| 2019/0271779 | A1 | 9/2019 | Margaritova et al. |

OTHER PUBLICATIONS

European Patent Office, "Extended European Search Report," issued in connection with European Patent Application No. 18000910.2, dated Apr. 17, 2019, 15 pages.

European Patent Office, "Examination Report," issued in connection with European Patent Application No. 17202468.9, dated Apr. 9, 2019, 10 pages.

European Patent Office, "Extended European Search Report," issued in connection with European Patent Application No. 18000909.4, dated Feb. 1, 2019, 14 pages.

William T. Joines et al., "Electromagnetic Emission From Humans During Focused Intent," The Journal of Parapsychology, Oct. 1, 2012, XP55574740, retrieved from the Internet: URL:http://www.rhine.org/images/jp/v76Fall2012/dJPF2012Joines.pdf, 20 pages.

Beverly Rubik et al., "Effects of Intention, Energy Healing, and Mind-Body States on Biophoton Emission Introduction," The Journal of Natural and Social Philosophy, Apr. 2, 2017, XP55574742, retrieved from the Internet:URL:https://pdfs.semanticscholar.org/706b/86f2b35fb0100105431e3edce06d019664f9.pdf, 22 pages.

Nobuhiro Yanai et al., "New Triplet Sensitization Routes for Photon Upconversion: Thermally Activated Delayed Fluorescence Molecules, Inorganic Nanocrystals, and Singlet-to-Triplet Absorption," Accounts of Chemical Research., vol. 50, No. 10, Sep. 20, 2017, pp. 2487-2495, XP55574763, 10 pages.

Tibor Jacob Hajagos, "Plastic Scintillators for Pulse Shape Discrimination of Particle Types in Radiation Detection," Jun. 6, 2017, XP855572429, retrieved from the Internet: URL:https://search.proquest.com/docview/1916898229?pq-origsite=gscholar, 150 pages.

J.L. Kiel, "Molecular Dosimetry", Radio Frequency Radiation Dosimetry and Its Relationship to the Biological Effects of Electromagnetic Fields, Springer Netherlands, Dordrecht, pp. 227-237, Jan. 1, 2000, XP809510393, retrieved from the Internet: URL:https://link.springer.com/chapter/10.1007/978-94-011-4191-8_25, 12 pages.

Mehmet Yuksel et al., "Dosimetric Characteristics of Anhydrous Borax," Sep. 2-4, 2015, XP55540889, Retrieved from the Internet:URL:https://www.researchgate.net/publication/282505033_Dosimetric_Characteristics_of_Anhydrous_Borax, 6 pages.

United States Patent and Trademark Office, Notice of Allowance, issued in connection with U.S. Appl. No. 16/195,357, dated Apr. 11, 2019, 31 pages.

Dias et al., "Photo physics of thermally activated delayed fluorescence molecules," Methods and Applications in Fluorescence, vol. 5, No. 1, 012001, Mar. 9, 2017, 26 pages.

European Patent Office, "Extended European Search Report," issued in connection with European Patent Application No. 17202468.9, dated Jun. 7, 2018, 9 pages.

United States Patent and Trademark Office, Corrected Notice of Allowability, issued in connection with U.S. Appl. No. 16/195,357, dated Nov. 27, 2019, 6 pages.

United States Patent and Trademark Office, Notice of Allowance, issued in connection with U.S. Appl. No. 16/195,357, dated Aug. 19, 2019, 8 pages.

United States Patent and Trademark Office, Non-final Office Action, issued in connection with U.S. Appl. No. 16/418,688, dated Apr. 7, 2020, 19 pages.

United States Patent and Trademark Office, Non-final Office Action, issued in connection with U.S. Appl. No. 16/195,341, dated Apr. 29, 2020, 8 pages.

United States Patent and Trademark Office, Notice of Allowance, issued in connection with U.S. Appl. No. 16/418,688, dated Jul. 17, 2020, 11 pages.

* cited by examiner

RADIATION DETECTION APPARATUS AND METHOD

FIELD OF THE INVENTION

The present invention relates, generally, to the field of detection of radiation, more particularly, to TADF (thermally activated delayed fluorescence) material based detection of radiation having extremely low energy level.

BACKGROUND OF THE INVENTION

The detection of radiation is widely used in science, medicine and industrial applications. However, detection of radiation of low and very low energy as well as radiation of low and very low intensity is still to be improved.

OBJECTION OF THE INVENTION

An object of the present invention is use enhance detection of radiation of low and very low intensity.

SUMMARY OF THE INVENTION

To solve the above object, the present invention provides apparatus and method subject-matter according to the accompanying independent claims, wherein variations, embodiments and examples thereof are defined in accompanying dependent claims.

More particularly, the present invention provides a radiation detection arrangement for detection of external radiation, wherein the arrangement comprises:
 a computing device,
 a detection layer comprising thermally activated delayed fluorescence TADF material, the thermally activated delayed fluorescence TADF material having an excitation frequency range and, exhibiting upon excitation with radiation in the excitation frequency range, a thermally activated delayed fluorescence TADF emission,
 an excitation radiation source device adapted to emit excitation radiation in the excitation frequency range,
 a radiation detector device communicatively coupled with the computing device, the radiation detector device being adapted to detect TADF emission from the detection layer and provide respective detection data to the computing device,
 the TADF material having a TADF emission pattern without exposure to external measurable radiation and exhibiting different TADF emission pattern with exposure to external measurable radiation,
 the computing device being adapted to
  compute detection data from the radiation detector device to determine a TADF emission pattern without exposure to external measurable radiation and a different TADF emission pattern with exposure to external measurable radiation,
  compare the determined TADF emission patterns,
  determine, on the basis of the comparison, exposure to external measurable radiation onto the detection layer.

The detection layer may be at least one of
 planar,
 provided in a coating material,
 shaped as a part of a sphere,
 shaped as a hollow or solid sphere,
 shaped as a polyhedron.

The radiation detector device may comprise at least one of
 a discrete radiation detector,
 a radiation detector array including at least two detector elements,
 electro-optical transducer,
 image intensifier tube,
 vacuum tube,
 CMOS chip
 a CCD chip.

The radiation detection arrangement may comprise at least two radiation detector devices wherein the detection layer is arranged between the at least two radiation detector devices.

The radiation detection arrangement may comprise a control device for controlling the operation of the excitation radiation source device, wherein the control devices is adapted to operate the excitation radiation source device in a constant emission mode and/or a variable/modifiable emission mode, comprising pulsed and/or periodical emission mode.

The computing device (26) may be able to compute detection data from the radiation detector device during and/or following radiation emission from the excitation radiation source device.

The radiation detection arrangement may comprise an optical system (30) being arranged between the detection layer and the radiation detector device.

The radiation detection arrangement may comprise a housing accommodating the components of the radiation detection arrangement.

The housing may have shielding properties for shielding of at least one of:
 electro-magnetic radiation;
 X-ray radiation;
 ultraviolet radiation;
 Gamma radiation;
 corpuscular radiation, comprising alpha radiation, beta radiation, neutrons and/or protons.

The radiation detection arrangement may comprise at least one temperature sensing device for sensing temperature of at least one of
 the detection layer,
 the TADF material,
 the excitation radiation source device,
 the radiation detector device,
 the housing,
 the optical system,
 the computing device.

The radiation detection arrangement or one or more parts thereof (particularly, the parts listed above) may be placed in a temperature controlled environment.

For example, it is envisaged to use a passive temperature controlled environment, where the radiation detection arrangement or one or more parts thereof is arranged in a box, container, housing and the like having thermal characteristics (e.g. walls with high thermal resistance) that maintain a temperature in its interior at least for some period of time. Examples for a passive temperature controlled environment include a Dewar flask/container.

Further, it is also envisaged to use an active temperature controlled environment, where the radiation detection arrangement or one or more parts thereof is arranged in a box, container, housing and the like for which the inner temperature may be actively controlled by using heating and/or cooling of the interior and at least one temperature sensor for temperature control.

Also, combinations of active and passive temperature controlled environments may be used, wherein, for example, some parts of the radiation detection arrangement are in an active temperature controlled environment and other parts of the radiation detection arrangement are in a passive temperature controlled environment.

Further, the present invention provides a method of detecting external radiation using a radiation detection arrangement, wherein the method comprises the steps of:

providing a detection layer comprising thermally activated delayed fluorescence TADF material, the thermally activated delayed fluorescence TADF material having an excitation frequency range and, exhibiting upon excitation with radiation in the excitation frequency range, a thermally activated delayed fluorescence TADF emission, emitting excitation radiation in the excitation frequency range by means of a excitation radiation source device onto the detection layer in order to excite the TADF material, detecting TADF emission from the detection layer by means of a radiation detector device communicatively coupled to a computing device, wherein
the TADF material having a TADF emission pattern/type without exposure to external measurable radiation and exhibiting different TADF emission pattern with exposure to external measurable radiation providing detection data from the radiation detector device to the computing device, computing the detection data from the radiation detector device (16) to determine a TADF emission pattern without exposure to external measurable radiation (10) and a different TADF emission pattern with exposure to external measurable radiation (10), comparing the determined TADF emission patterns, determining, on the basis of the comparison, exposure to external measurable radiation (10) onto the detection layer (12).

The method may further comprise the steps of:

controlling the operation of the excitation radiation source device by means of a control device and emitting radiation, by operating the excitation radiation source device, in a constant emission mode and/or a variable/modifiable emission mode, comprising pulsed and/or periodical emission mode.

According to the method of the present invention, in an excitation phase, excitation radiation is emitted onto the detection layer in order to excite the TADF material and, in a detection phase subsequent to the excitation phase, TADF emission from the detection layer is detected.

In some examples, the excitation phase and the detection phase may, at least partially, overlap. For example:

the excitation phase and the detection phase may start at the same time and may take place for the same period of time;

the excitation phase and the detection phase may start at the same time, wherein the excitation phase ends, while the detection is phase is still ongoing and is continued for some further period of time;

the detection phase takes place for a period of time, during which at least two excitation phases take place one after another with a pause therebetween (i.e. period of time without excitation), wherein the at least excitation phases may have the same duration or different durations;

the excitation phase may start and, at some point of time when the excitation phase takes place, the detection phase may also start, wherein the excitation phase may end earlier or at the same time, or later than the detection phase.

In further examples, there may a transition phase between the excitation phase and the detection phase, during which transition phase neither excitation nor detection takes place.

The method may further comprise the step of arranging an optical system between the detection layer and the radiation detector device for adjusting the TADF emission onto the radiation detector device.

The method may further comprise the steps of:

providing a housing, having shielding properties to shield at least one of:

electro-magnetic radiation,

X-ray radiation,

Ultraviolet radiation,

Gamma radiation,

Corpuscular radiation, alpha radiation, beta radiation, neutrons protons.

The method may further comprise at least one of the steps of:

thermally calibrating the radiation detection arrangement for compensation of temperature related effects on the radiation detection device, arrangement calibrating the radiation detection device as such for compensation of at least background radiation to which the radiation detection device is exposed.

SUMMARY OF THE DRAWINGS

In the description of embodiment further below, it is referred to the following drawings, which show.

DESCRIPTION OF EMBODIMENTS

Generally, features and functions referred to with respect to specific drawings and embodiments may also apply to other drawings and embodiments, unless explicitly noted otherwise.

Known conventional components, which are necessary for operation, (e.g. energy supply, cables, controlling devices, processing devices, storage devices, etc.) are neither shown nor described, but are nevertheless considered to be disclosed for the skilled person.

Figure 1:
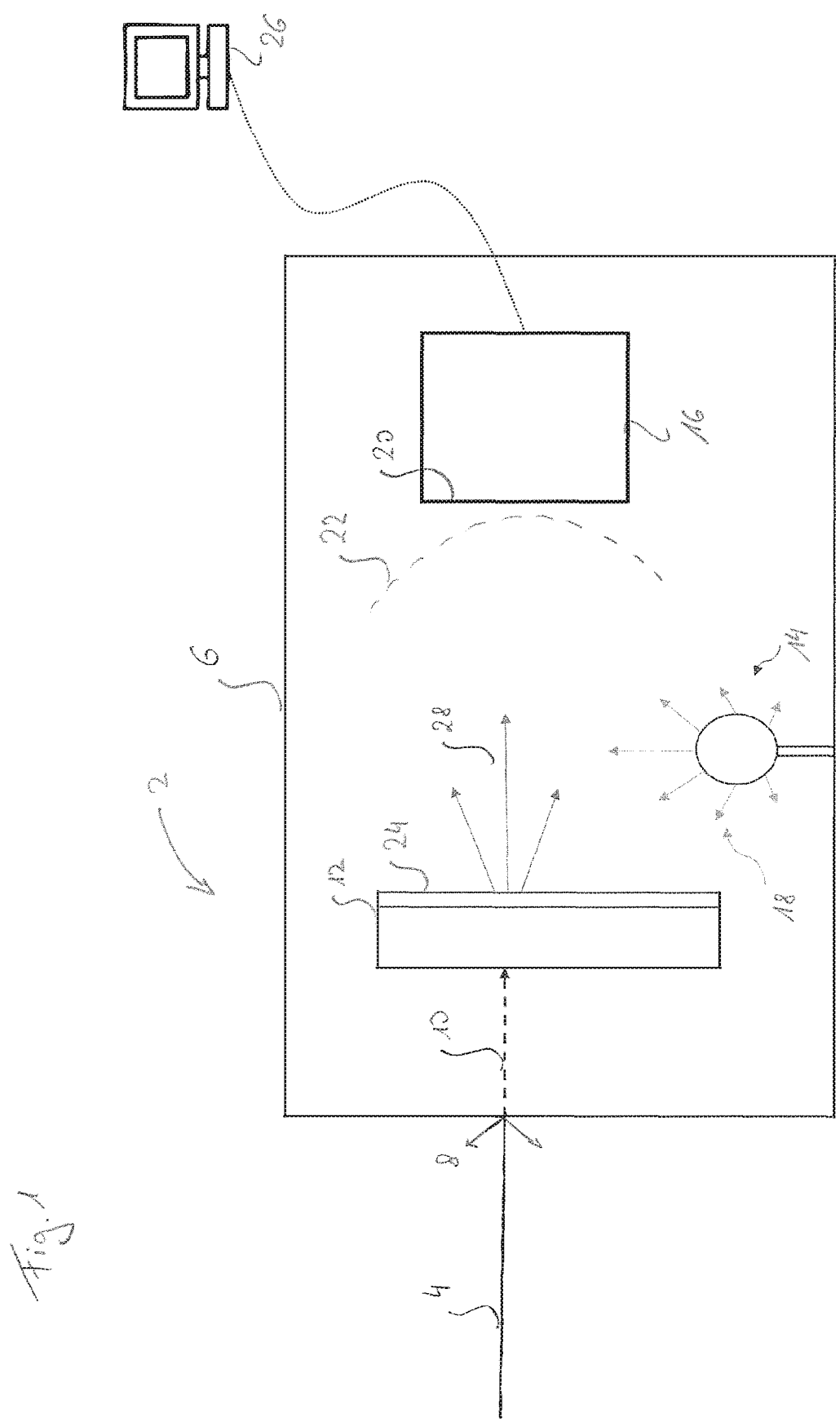
FIG. 1 a schematic illustration of a radiation detection arrangement for detection of external radiation, FIG. 2 a schematic illustration of a further radiation detection arrangement for detection of external radiation, FIG. 3 a schematic illustration of a yet further radiation detection arrangement for detection of external radiation, FIG. 4 a schematic illustration of radiation detection arrangement's emission patterns with and without external radiation, FIGS. 5a and 5b schematic illustrations for explanation of emission distributions with and without external radiation, FIG. 6 exemplary detection data from arrangement calibration using a known radiation source, FIGS. 7a and 7b reproductions of measurements carried out with a radiation detection arrangement.

FIG. 1 schematically illustrates a radiation detection arrangement 2 for detection of external radiation having low intensity and/or energy. External radiation 4 refers to radiation impinging onto the radiation detection arrangement 2 and/or the radiation detection arrangement 2 is exposed to.

In the drawings, just a radiation beam along one direction (like from a single source) is illustrated. However, this is just for simplification. Rather, external radiation 4 may include more than one radiation beam, namely a plurality thereof, and/or radiation fronts. Also, external radiation 4 may impinge from more than one direction, e.g. a plurality of different directions even opposing ones.

The radiation detection arrangement 2 comprises a housing 6. The housing 6 acts as shield against external radiation 6 that shall not be detected by the radiation detection arrangement 2. Such radiation is referred to as shieldable radiation 8. Examples for shieldable radiation 8 include one or more of the following: visible light, neutrons, electrons, protons, myons, cosmic radiation, electro-magnetic radiation, X-ray radiation, ultraviolet radiation, Gamma radiation, corpuscular radiation, alpha radiation, beta radiation, thermal radiation, thermal disturbances.

Shieldable radiation 8 is blocked by the housing 6 so that no part of shieldable radiation 8 can enter the space defined the housing 6. This is illustrated in the drawings by arrows 10 indicting reflected shieldable radiation. However, shielding effected by the housing 6 may be (additionally or alternatively) provided by absorption or any other way ensuring that no shieldable radiation reaches the inner of the housing.

Contrary thereto, the housing 6 does not block, shield off or prohibit in any other way external radiation that may be measured. Such radiation is referred to a measurable radiation 10.

Examples for measurable radiation 10 include one or more of the following: neutrinos, neutralinos, WIMPS (Weakly interacting massive particles), high penetrating cosmic rays and particles, high penetrating radiation from nuclear reactors and nuclear sets.

The housing 6 may be adapted to act as at least one of the following:
  optically non-transparent shield,
  thermal shield,
  electromagnetic shield,
  shield against at least one of UV radiation, gamma radiation, corpuscular radiation, X-rays, alpha radiation, beta radiation.

The material of the housing 6 may comprise, for example, at least one of the following:
  metal (e.g. for optically non-transparent shielding),
  plastic (e.g. for optically non-transparent shielding),
  gas gap and/or low thermal conductivity polymers (e.g. for thermal shielding),
  multi layered construction including layers of different material, for example alternating layers of material having low and high thermal conductivity, like copper foil, (e.g. for thermal shielding),
  low thermal conductivity material, like polymer, (e.g. for thermal shielding),
  closed (e.g. complete and/or hermetic) grounded metal coating (e.g. Al, Cu) (e.g. for electromagnetic shielding) UV/gamma/corpuscular/X-rays/alpha/beta shield:
  Aluminum (e.g. for shielding of at least one of UV radiation, gamma radiation, corpuscular radiation, X-rays, alpha radiation, beta radiation),
  glass (e.g. for shielding of at least one of UV radiation, gamma radiation, corpuscular radiation, X-rays, alpha radiation, beta radiation),
  textolite (e.g. for shielding of at least one of UV radiation, gamma radiation, corpuscular radiation, X-rays, alpha radiation, beta radiation),
  concrete (e.g. for shielding of at least one of UV radiation, gamma radiation, corpuscular radiation, X-rays, alpha radiation, beta radiation).

An exemplary housing may have walls comprising an Aluminum sheet/layer with a thickness of at least about 10 mm; one, two or three glass layers each having a thickness of at least about 2 mm; a textolite layer with a thickness of about 1 mm with an optional cooper foil at least at one side of the textolite layer.

The distance between the inner surface of the housing 6 and the detection layer 12 may be 0 mm (i.e. no distance) or, for example, in the range of at least about 30 mm.

Further shielding can be achieved by providing a housing that—in addition to at least one of the above mentioned examples or as option thereto—is made of concrete and completely surrounds the radiation detection arrangement. This can be accomplished by, for example, positioning the radiation detection arrangement in a hollow concrete cube having 6 concrete walls with a thickness of, e.g., about 3 meters and more.

Inside the housing 6, the radiation detection arrangement 2 comprises a detection layer 12, which comprises at least a TADF material, i.e. material exhibiting thermally activated delayed fluorescence. The TADF material of the detection layer 12 has an excitation frequency range, where the TADF material, if being excited by radiation in the excitation frequency range, exhibits a thermally activated delayed fluorescence.

Also inside the housing 6, the radiation detection arrangement to comprises a excitation radiation source 14 and a radiation detector device 16.

The excitation radiation source device 14 is capable of providing radiation (at least) in the excitation frequency range of the TADF material. Such radiation is referred to as excitation radiation 18. The excitation radiation source device 14 can be controlled to provide continuous excitation radiation 18, i.e. to be operated in a constant emission mode. The excitation radiation source device 14 can be controlled to provide non-continuous excitation radiation 18, i.e. to be operated in a variable emission mode, to provide, for example, pulsed and/or periodical excitation radiation.

The excitation radiation source device 18 can comprise one or more excitation radiation sources, for example, one or more LEDs. The drawings show a single excitation radiation source device 18. However, two and more excitation radiation source devices arranged adjacent to each other or spaced from each other can be employed.

The radiation detector device 16 is capable of detecting (at least) radiation provided by the detection layer 12, particularly thermally activated delayed fluorescence from the TADF material in response to excitation by excitation radiation from the excitation radiation source device 18.

The radiation detector device 16 can comprise one or more radiation detectors, for example photo detectors being sensitive to a least fluorescence that the TADF material can emit.

Figure 2:
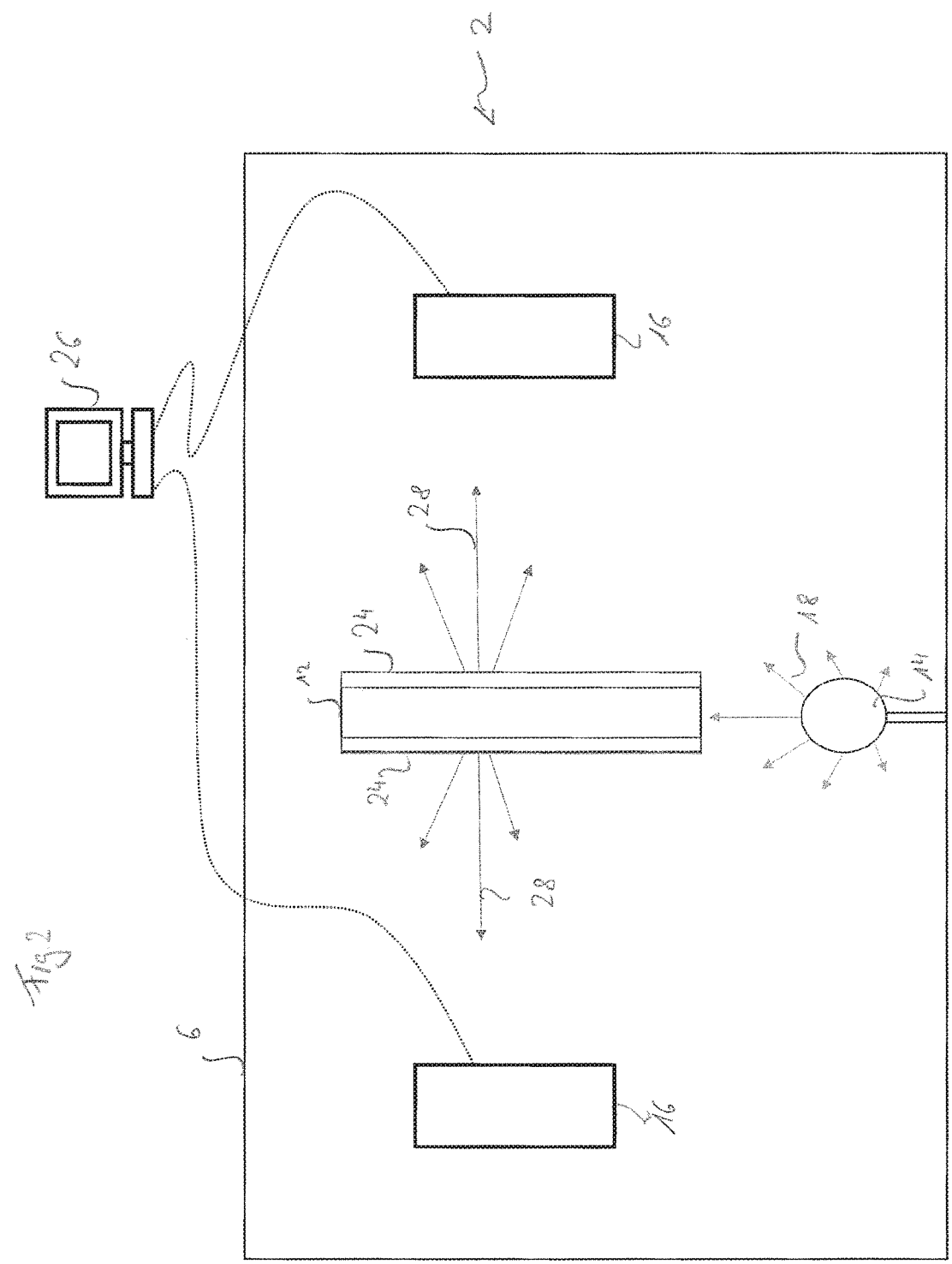
Figure 3:
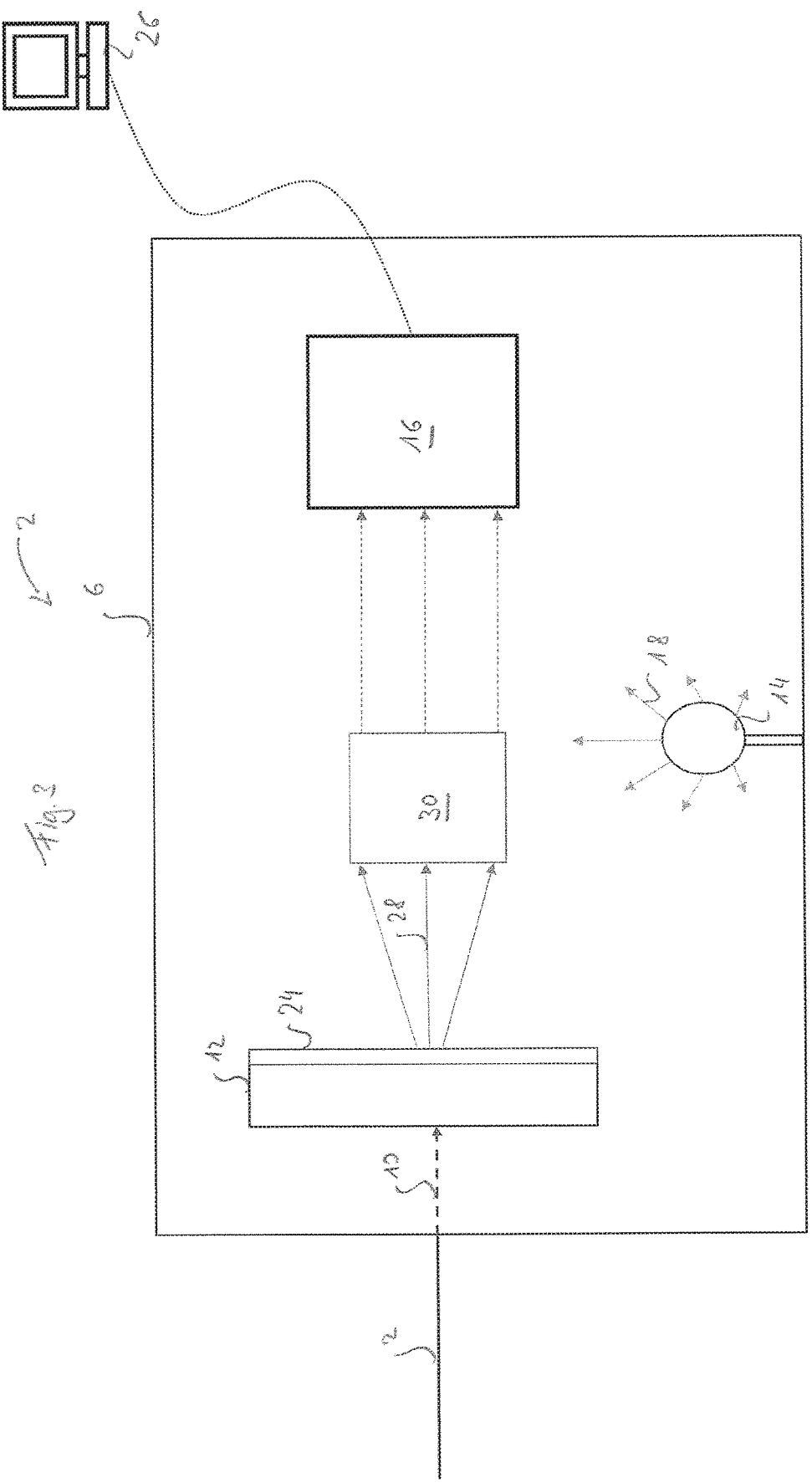

As illustrated in FIGS. 1 and 3, one radiation detector device 16 can be employed, while FIG. 2 illustrates an embodiment employing two radiation detector devices 16. However, more than two radiation detector devices 16 can be used, in order to, for example, detect radiation from the detection layer at different locations in the housing 6.

The radiation detector device 16 can have a planar detection surface 20, as illustrated in the drawing. However, radiation detector devices having a, for example, curved detection surface as indicated by the dashed curved detection surface 22 in FIG. 1.

The size and form of the detection surface can be designed such that it conforms the size and form of a detection layer's emission surface 24 from where detection layer radiation and, particularly, TADF fluorescence can be emitted. This allows capturing and detecting as much radiation from the detection layer as possible.

According to the illustrations of FIGS. 1 and 3, the detection layer 12 has a single emission surface 24, while the detection layer 12 of FIG. 2 has two emission surfaces 24.

The radiation detector device 16 is capable of outputting detection data indicating radiation detected by the radiation detector device 16.

In addition or as alternative, an optical system can be arranged between the detection layer 12 and a radiation detector device 16, as explained further below with reference to FIG. 3.

The radiation detection arrangement 2 further includes computing device 26. The computing device 26 is communicatively coupled with the radiation detector device 16 to, at least, obtain detection data outputted from the radiation detector device 16. Further, the computing device 26 may be arranged to control the radiation detector device 16 and its operation, respectively.

The computing device 26 may be also communicatively coupled with the excitation radiation source device 14 to control the operation thereof.

A communicative coupling between the computing device 26 and another part of the radiation detection arrangement (e.g. the radiation detection device 16 and excitation radiation source device 14) may be wired and/or wireless.

The computing device 26 is adapted, e.g. in the form of respectively designed hardware and/or software, to compute detection data from the radiation detector device 26 in a manner to determine one or more emission patterns resulting from radiation emitted by the detection layer and, particularly, from thermally activated delayed fluorescence from the TADF material.

If applicable, the computing device 26 may control the operation of the excitation radiation source device 14. For example, the excitation radiation source device 14 may be controlled such that it emits excitation radiation 18 synchronized with detection operation of the radiation detector device 26. In some examples, the following procedure may be used: The excitation radiation source device 14 may be operated to emit excitation radiation for a predefined first period of time (e.g. a phase of 1 ms).

Then, during a second predefined period of time (e.g. a phase of 1 ms) no excitation radiation is emitted and the radiation detector device 26 is not activated/operated to detect radiation from the detection layer 12 and, particularly thermally activated delayed fluorescence from the TADF material. This period of time and phase, respectively, allows transition processes to take place in, e.g., the TADF material and/or the hardware components of the arrangement.

After that, during a third predefined period of time (e.g. a phase of 3 ms) the radiation detector device 26 is activated/operated to detect radiation from the detection layer 12 and, particularly thermally activated delayed fluorescence from the TADF material.

This procedure can be referred to as radiation detection based on pre-excited TADF material, because in a first phase (also referred to a excitation phase) TADF material is excited by excitation radiation and in a second phase (also referred to a detection phase) TADF emission is detected/sensed on the basis of which measurable radiation can be detected. Preferably, as indicated above, there is an intermediate phase (also referred to as transition phase) between the excitation phase and the detection phase In other examples, the excitation radiation source device 14 may be operated to emit excitation radiation as pulses of the same or different level and/or with predefined time intervals of the same or varying length in between. Also, the excitation radiation source device 14 may be operated to emit constant excitation radiation (without periods without excitation radiation) of the same level or of at least two different levels (e.g. like a waveform or stepwise).

Generally, any type of one or more TADF material and combinations thereof may employed. An exemplary TADF material used in experiments included an organic luminofor comprising a mixture of fluorescein Natrium and boric acid.

A possible mass ration of the components can be in the range of 1:100,000-1:500.

Figure 4:
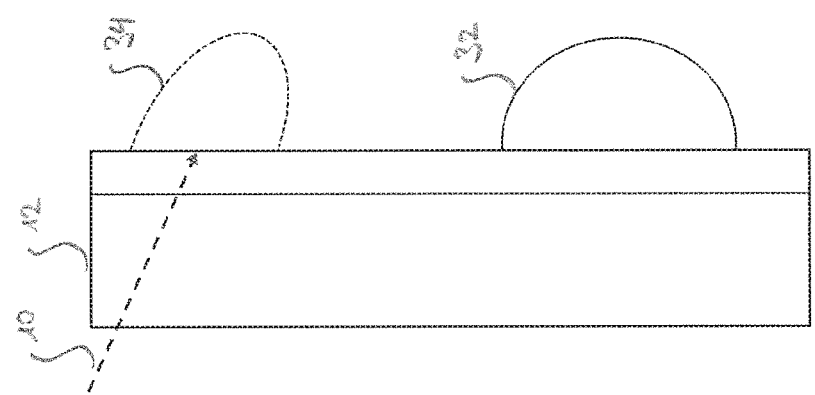

The components can be mixed and heated to manufacture the exemplary TADF material, for example according to the heating profile shown in FIG. 4. The mixed materials are heated up a maximal temperature in the range between 200° C. and 260° C. for at least 20 minutes under a pressure below 0.8 bar.

The heating may be performed in pre-molded forms to obtain TAFD material having a predefined shape. Also, after heating the material can be grounded and mixed with a carrier material (e.g. epoxy), after which the resulting material can be formed to get any desired shape (e.g. by applying onto a support surface).

The radiation detection device of FIG. 1, the TADF material of the detection layer 12 is excited by excitation radiation 18 from the excitation radiation source device 14, and in response thereto, emits thermally activated delayed fluorescence 28. The emitted thermally activated delayed fluorescence 28 impinges onto the radiation detector device 16, which generates respective detection data. The detection data generated by the radiation detector device 16 are computed by the computing device 26 to determine one or more emission patterns resulting from thermally activated delayed fluorescence from the TADF material.

In general, this is also the case with the radiation detection devices of FIGS. 2 and 3.

However, in the radiation detection device of FIG. 2, two radiation detector devices 16 are used to detect thermally activated delayed fluorescence 28 emitted by the TADF material of the detection layer 12. The detection data respectively generated by the radiation detector devices 16 are computed by the computing device 26 to determine one or more emission patterns resulting from thermally activated delayed fluorescence from the TADF material. Since detection data from two radiation detector devices 16 are available, the detection data from the different radiation detector devices 16 can be used to compare the one or more emission patterns on one of radiation detector devices 16 with the one or more emission patterns of the other radiation detector device 16.

For example, two and more radiation detector devices 16 can be used for a correlated detection of measurable radiation 10, wherein, e.g., only synchronized detection data from different radiation detector devices 16. Synchronization may include to operate the radiation detection devices 16 such that their respective detection data are provided at the same time or processed such that detection data generated at the same time and/or in the same time period are processed together. In addition or as alternative, synchronization may include to use together detection data being generated at/in corresponding areas of the respective detection surfaces of the radiation detection devices 16. In addition or as alternative, synchronization may include using detection data being indicative of TADF emission coming from different parts/surfaces of the detection layer 12 and TADF material, respectively, in order to, for example, detect TADF emission from opposing detection layer's surfaces as illustrated in FIG. 2.

As further example, two and more radiation detector devices 16 can be used to distinguish different types of measurable radiation 10, wherein, e.g., differences between detection data from different radiation detector devices 16 are calculated. More detailed observations in this respect can be find further below with reference to FIGS. 5a and 5.

In the radiation detection device of FIG. 3, an optical system 30 is used to collect and/or focus thermally activated delayed fluorescence from the TADF material onto the radiation detector device 16, in order to, for example, avoid "loosing" such radiation from being captured by the radiation detector device.

In any case, the pattern in which thermally activated delayed fluorescence is emitted from the TADF material depends on external radiation reaching the TADF material. As illustrated in FIG. 4, without external radiation reaching the detection layer 12 (i.e. without measurable radiation 10), the TADF material exhibits a more or less homogenous emission pattern 32. If external radiation reaches the detection layer 12 (i.e. case with measurable radiation 10), the TADF material exhibits a shifted emission pattern 34, wherein the pattern shift depends from the direction of the measurable radiation 10. In other words, This is further illustrated in FIG. 4b, which shows that measurable radiation 10 "deforms" the homogenous emission pattern 32 to the shifted emission pattern 34. This deformation can be used to determine the direction of incoming measurable radiation 10.

Figure 5C:
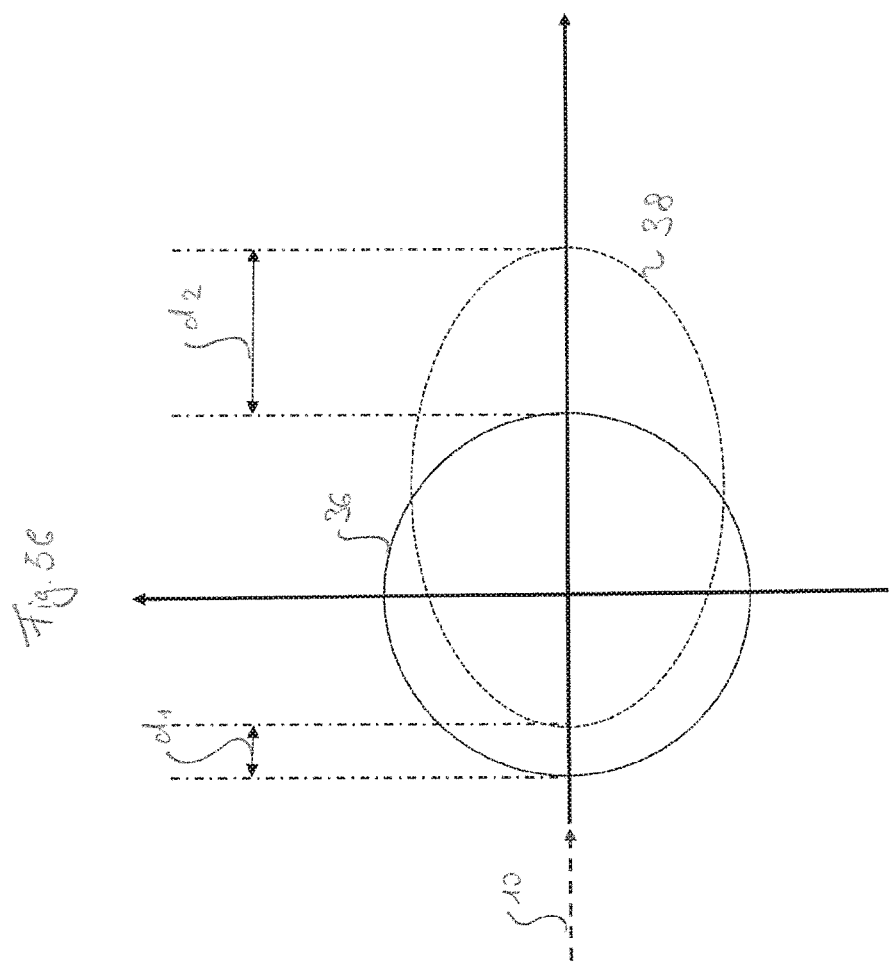

As shown in FIG. 5a, without measurable radiation 10, thermally activated delayed fluorescence from the TADF material results in a uniform distribution 36 of photon emission. As illustrated in FIG. 5b, measurable radiation 10 shifts and deforms the emission pattern such that a shifted and deformed distribution 38 of photon emission results. For example, in the illustration of FIG. 5b the distances d1 and d2 between corresponding areas of the uniform distribution 36 and the shifted and deformed distribution 38 indicate that the direction along which the underlying measurable radiation 10 comes from.

As known, in response to excitation radiation, generally TADF material exhibits two effects, namely TAFD emission and phosphorensce emission. While phosphorensce emission results from an inter system crossing (ISC) transition, i.e. a transition from the S1 state to the T1 state, TADF emission results from a reverser ISC transition, i.e. a transition from the T1 state to the S1 state.

However, experiments have demonstrated that phosphorensce emission does not show a reaction to external radiation and measurable radiation, respectively; at least the reaction has not impact on the radiation detection based on TAFD emission. Particularly, external/measurable radiation does not affect phosphorensce emission of TADF material such shifted emission pattern as shown in FIGS. 4 and 5 results. Rather, the phosphorensce emission pattern remains essential the same. Therefore, phosphorensce emission impinging on the radiation detection device 16 can be considered as essentially constant background light.

Data outputted by the radiation detection device 16 in response to received phosphorensce emission can be compared with background noise and treated in the same way. For example, overall data output from the radiation detection device 16 may be filtered to remove phosphorensce emission related data in order to obtain, as effective radiation detection device output, detection data being indicative of TADF emission.

In general, TADF material is temperature sensitive and, as a result, has temperature dependent TADF emission. Therefore, a thermal calibration method may be used to compensate temperature related effect.

For example, the whole radiation detection arrangement 2 may be set up in a thermally controlled thermal chamber, in which the temperature is controlled to change from a low/minimum level to a high/maximum level, preferably with constant speed. The temperature may be changed so slow that, inside the thermal chamber, a quasi thermal equilibrium is achieved. For example, the temperature change may be such that the time constant of the thermal calibration method time constants of the thermal calibration method are smaller than dynamics of the thermal chamber of the thermal calibration setting. For example, in some cases the time constant of the thermal calibration method can be in the range of about two seconds and measuring time constant of the thermal calibration setting can be in the range of about two minutes. As further example, the thermal dynamics of the thermal calibration setting can be a thermal change in the range of about 20° C. in about one hour.

The above temperature change process may carried out once or may be repeated for two or more different temperature change profiles (e.g. different constant speeds, stepwise including using different step sizes). Experiments have shown that one or more temperature change processes lasting about five to seven hours provide a good basis for thermal calibration.

During thermal calibration, the radiation detection arrangement 2 may be operated normally, for example, so that the TADF material is excited by excitation radiation and TADF emission is detected by the radiation detector device 16.

During the temperature change process(es), temperature and changes thereof of at least one of the detection layer 12, the TADF material, the excitation radiation source device 14 (and/or components thereof), the radiation detection device 16, the detection surface (e.g. detection surface 20 or 22), the detection layer's surface, the optical system 30, the housing 6 and electrical and/or electronic components (e.g. cables, amplifiers, signal conditioners, ADCs etc.) in the housing and/or in the thermal chamber are measured. This may be accomplished by one or more temperature sensors respectively arranged in/on the housing and/or the thermal chamber.

The thusly measured temperatures and changes thereof (e.g. in form of respective time series) and, particularly, information on the TADF material temperature and changes thereof, can be used to determine information (e.g. in form of regression curves) indicative of the temperature dependency of the radiation detection arrangement 2 and parts thereof, for example data output by the radiation detector device 16 and/or data received by the computing device 26.

Such information may be used to compensate temperature dependent effects in radiation detection by the radiation detection device 2.

In this context, it is noted that it can be assumed that generally there is no correlation between, on the one hand, external radiation 4 reaching the radiation detection arrangement 2 and measurable radiation 10 reaching the detection layer 12 and, on the other hand, temperature changes affecting the radiation detection arrangement 2. Nevertheless, it is preferred to not carry out calibration during unusual cosmic events, like full/new moon, solar flares and/or storms, Midheaven (Milky Way at MC point), for avoiding impacts thereof onto calibration.

A further calibration may be carried out for the radiation detection arrangement 2 as such. Such calibration is also referred to as arrangement calibration. Arrangement calibration may be accomplished before or after operating the radiation detection arrangement 2 for radiation detection or during such operation of the radiation detection arrangement 2.

Arrangement calibration can be made using known radiation source(s). Examples for possible such radiation sources include radiation sources with known power (e.g. power spectral density) and/or radiation sources with known time pattern of radiation. Such radiation sources may provide "artificial" radiation, for example, radioactive radiation emitted by radioactive material, X-ray radiation from X-ray radiation shields, electromagnetic (EM) radiation from EM transmitters, etc. in addition or an alternative, such as radiation sources may provide "natural" radiation, for example, cosmic objects with variable radiation and known time pattern of radiation, like e.g. pulsar, variable star, etc., cosmic objects with constant radiation and known time pattern of radiation (e.g. due to earth movement and rotation) like e.g. sun, planets, deep space objects, etc., combination of radiation from such cosmic objects, natural radioactive sources.

On the basis of known radiation source(s), arrangement calibration may include operating the radiation detection arrangement 2 to detect radiation including radiation from one or more known radiation sources, processing (e.g. filtering including for example, digital filtering in time domain and/or correlation filtering) data from the radiation detector device 16 to remove data indicative of radiation not coming from the known radiation source(s) (e.g. data indicating noise, unknown radiation) and using the processed data as data for arrangement calibration.

During such an arrangement calibration, the radiation detection arrangement 2 may be kept stationary, i.e. is not moved. However, particularly in the case of a radiation source providing "artificial" radiation, the radiation source may be moved, for example, in order to generate a timely radiation emission pattern.

Figure 6A:
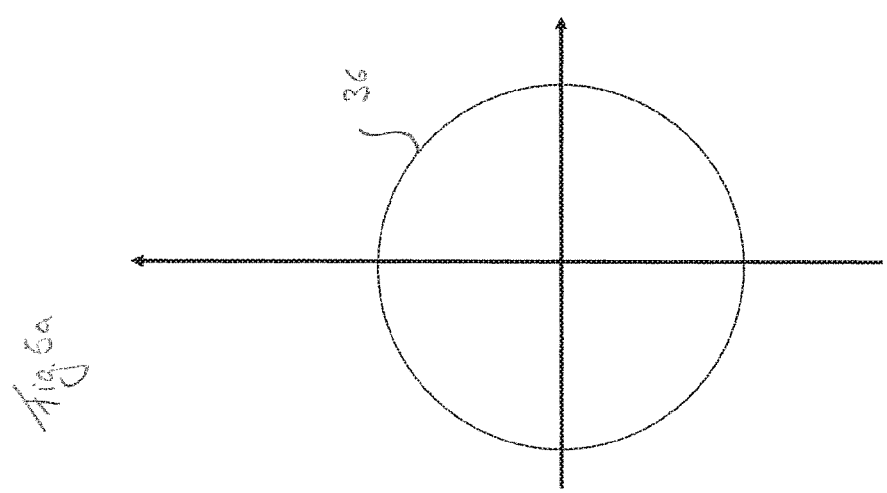
Figure 6:
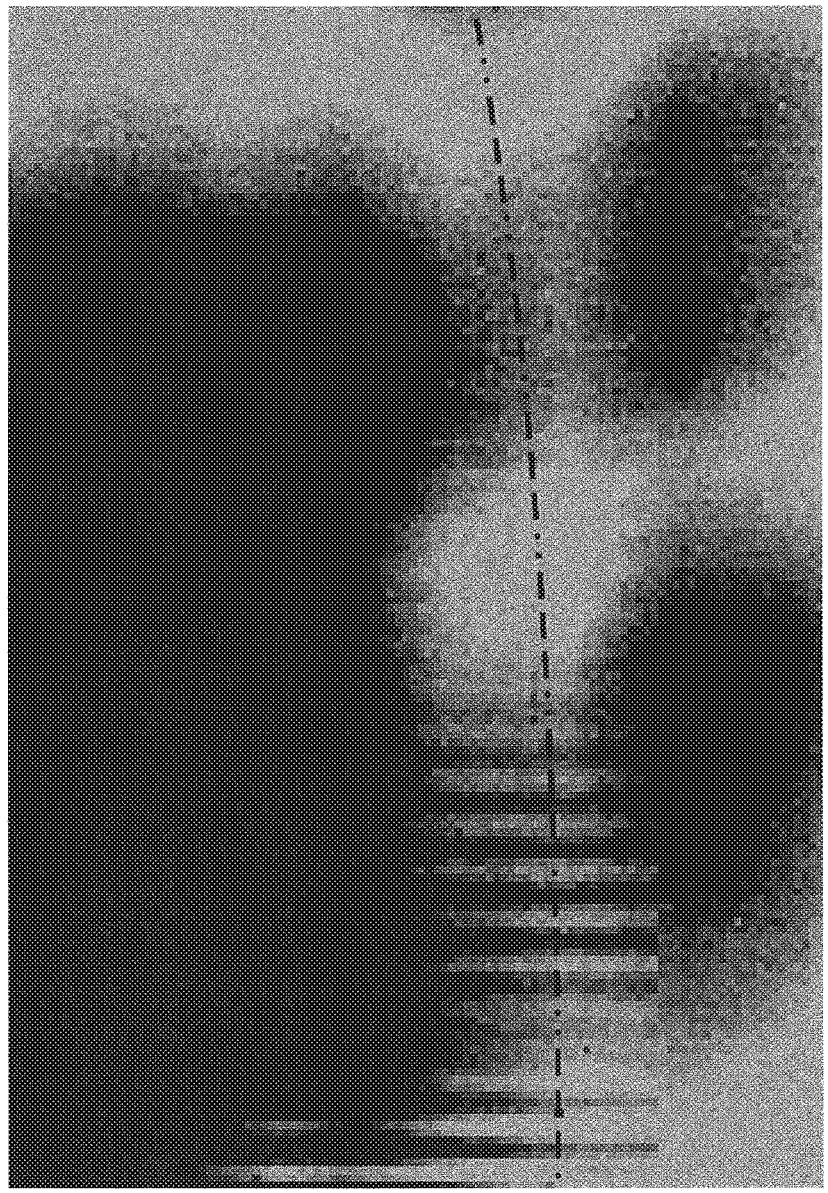

For example, a tube (of e.g. about 8 cm length) including a source of radioactive radiation, e.g. Tritium, may be arranged on the end of a rotatable arm. The radiation detection arrangement 2 is positioned such that the tube closely passes by the radiation detection arrangement 2 for each 360° revolution of the arm. The resulting detection data is reproduced in FIG. 6, in which the black line indicates the movement of radiation from the radioactive radiation source as being passed by the radiation detection arrangement 2.

Arrangement calibration can be made using background radiation. Here, a so-called active calibration and so called passive calibration may be used.

For active arrangement calibration on the basis of background radiation, the radiation detection arrangement 2 may be rotated in all possible directions for some time. Due to the direct activity of the radiation detection arrangement 2 in combination with the rotations thereof, sources directing radiation onto the radiation detection arrangement 2 will sometimes reach the radiation detector device and sometimes not. Thus, the overall data output from the radiation detector device 16 during the time of rotation includes just small peaks above background radiation level. These data peaks can be removed (e.g. filtered) in order to determine background radiation to which the radiation detection arrangement 2 is exposed.

For passive arrangement calibration on the basis of background radiation, a radiation detection arrangement 2 having a field of view wider than the field of interest is used. Such a wider field of view it can be achieved by, for example, using a radiation detector device 16 having a detection surface being large enough to cover more than the field of interest; such a larger detection surface can be obtained by, e.g. matrix photo sensor and/or modulation (for example by rotation/movement of the radiation detector device 16). Data from the radiation detector device 16 will include data indicative of measurable radiation directed on the detection layer (generally coming from the field of interest) and data indicative of background radiation. Data indicative of background radiation can be removed (e.g. filtered) from data indicative of measurable radiation directed on the detection layer.

In both active and passive arrangement calibration on the basis of background radiation, information on background radiation may be used for calibration of the radiation detection arrangement 2.

Figures 7A, 7B:
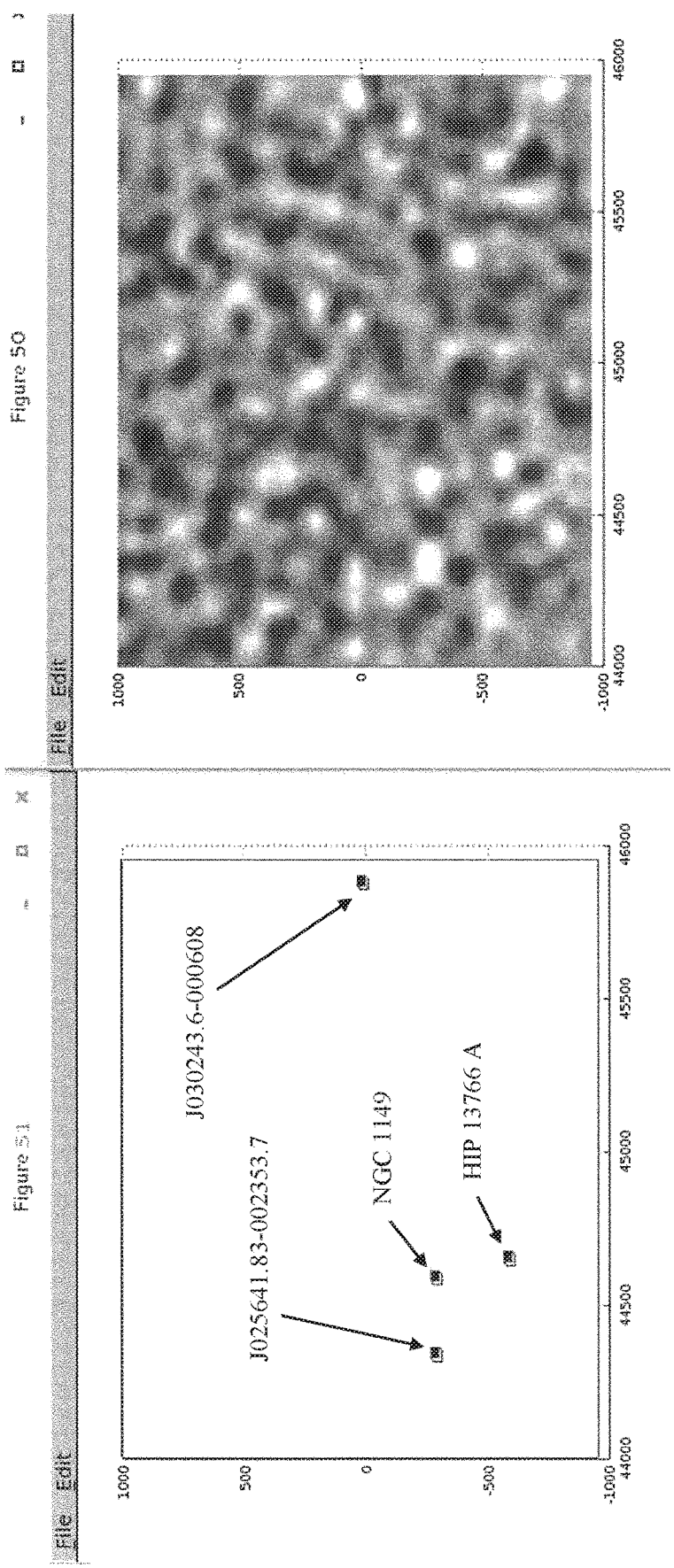

FIGS. 7*a* and 7*b* show reproductions of measurements carried out with a radiation detection arrangement. FIG. 7*b* shows a graphical representation of detection data obtained during a radiation detection device 2 was directed into the sky for 17 days of observation. For each observation day, the detection data was cumulatively collected and processed to generate an measurement image for the respective day. The 17 day images were cross-correlated and the representation of FIG. 7*b* was obtained.

Then, the representation of FIG. 7*b* was processed to determine to biggest local maximum values. Four biggest local maximum values were determined, which are shown in FIG. 7*a*. During the 17 day observation, the radiation detection arrangement 2 was directed to a specific portion of the sky, where the locations of stars and cosmic objects was known. Starting therefrom, it can be said that the upper center spot/maximum is indicative of the NGC 1149 galaxy and that the lower center spot/maximum is indicative of the HIP 13766 A double star. The right hand side spot/maximum is indicative of an object with [VV2003c] J030243.6-000608 identificator in SIMBAD database (Seyfert 1 galaxy with Active Galaxy Nucleus). The left hand side spot/maximum is indicative of an Left one is an object with SDSS J025641.83-002353.7 identificator in SIMBAD database (a Quasar).

This patent arises from a U.S. Patent Application that claims the benefit of, and priority to, European Patent Application EP 17 202 468.9, filed Nov. 19, 2017. European Patent Application EP 17 202 468.9 is hereby incorporated herein in its entirety.

Above, the present invention has been described with reference to detection of radiation space born and from outer space, respectively, as well as of radiation from radioactive material. However, the present invention is not limited to such applications, but can be used to detect any radiation of (very) low intensity and application using such information.

| Reference numeral list | |
|---|---|
| 2 | Radiation detection arrangement |
| 4 | External radiation |
| 6 | Housing |
| 8 | Shieldable radiation |

-continued

| Reference numeral list | |
|---|---|
| 10 | Measurable radiation |
| 12 | Detection layer |
| 14 | Excitation radiation source device |
| 16 | Radiation detector device |
| 18 | Excitation radiation |
| 20 | Planar detection surface |
| 22 | Curved detection surface |
| 24 | Detection layer's surface |
| 26 | Computing device |
| 28 | Thermally activated delayed fluorescence |
| 30 | Optical system |
| 32 | Homogenous emission pattern |
| 34 | Shifted emission pattern |
| 36 | Uniform distribution pattern |
| 38 | Shifted and deformed distribution pattern |

The invention claimed is:

1. Radiation detection arrangement for detection of external radiation, the arrangement comprising:
a computing device,
a detection layer comprising thermally activated delayed fluorescence TADF material, the thermally activated delayed fluorescence TADF material having an excitation frequency range and, exhibiting upon excitation with radiation in the excitation frequency range, a thermally activated delayed fluorescence TADF emission,
the excitation radiation being electromagnetic radiation,
an excitation radiation source device adapted to emit excitation radiation in the excitation frequency range in order to excite the TADF material,
a radiation detector device communicatively coupled with the computing device, the radiation detector device being adapted to detect TADF emission from the detection layer and provide respective detection data to the computing device,
the TADF material having a TADF emission pattern excited by the excitation radiation from the excitation radiation source device without exposure to external measurable radiation and exhibiting a different TADF emission pattern excited by the excitation radiation from the excitation radiation source device with exposure to the external measurable radiation, the external measurable radiation differing from electromagnetic radiation, the TADF emission pattern with exposure to external measurable radiation differing from the TADF emission pattern without exposure to external measurable radiation,
the computing device being adapted to
compute detection data from the radiation detector device to determine a TADF emission pattern excited by the excitation radiation from the excitation radiation source device without exposure to external measurable radiation and a different TADF emission pattern excited by the excitation radiation from the excitation radiation source device with exposure to the external measurable radiation, the external measurable radiation differing from electromagnetic radiation, the TADF emission pattern with exposure to external measurable radiation differing from the TADF emission pattern without exposure to external measurable radiation,
compare the determined TADF emission patterns,
determine, on the basis of the comparison, exposure to external measurable radiation onto the detection layer.

2. The radiation detection arrangement of claim 1, wherein the detection layer is at least one of:
planar,
provided in a coating material,
shaped as a part of a sphere,
shaped as a hollow or solid sphere,
shaped as a polyhedron.

3. The radiation detection arrangement of claim 1, wherein the radiation detector device comprises at least one of
a discrete radiation detector,
a radiation detector array including at least two detector elements,
electro-optical transducer,
image intensifier tube,
vacuum tube,
CMOS chip
a CCD chip.

4. The radiation detection arrangement of claim 1, comprising at least two radiation detector devices wherein the detection layer is arranged between the at least two radiation detector devices.

5. The radiation detection arrangement of claim 1, comprising a control device for controlling the operation of the excitation radiation source device, wherein the control devices is adapted to operate the excitation radiation source device in a constant emission mode and/or a variable/modifiable emission mode, comprising pulsed and/or periodical emission mode.

6. The radiation detection arrangement of claim 1, wherein the computing device being able to compute detection data from the radiation detector device during and/or following radiation emission from the excitation radiation source device.

7. The radiation detection arrangement of claim 1, comprising an optical system being arranged between the detection layer and the radiation detector device.

8. The radiation detection arrangement of claim 1, comprising a housing accommodating the components of the radiation detection arrangement.

9. The radiation detection arrangement of claim 1, wherein the housing has shielding properties for shielding of at least one of:
electro-magnetic radiation;
X-ray radiation;
ultraviolet radiation;
Gamma radiation;
corpuscular radiation, comprising alpha radiation, beta radiation, neutrons and/or protons.

10. The radiation detection arrangement of claim 1, comprising at least one temperature sensing device for sensing temperature of at least one of
the detection layer,
the TADF material,
the excitation radiation source device,
the radiation detector device,
the housing,
the optical system,
the computing device, and/or
wherein the radiation detection arrangement or at least one part thereof is arranged in a temperature controlled environment.

11. Method of detecting external radiation using a radiation detection arrangement, comprising:
providing a detection layer comprising thermally activated delayed fluorescence TADF material, the thermally activated delayed fluorescence TADF material having an excitation frequency range and, exhibiting upon excitation with radiation in the excitation frequency range, a thermally activated delayed fluorescence TADF emission, emitting excitation radiation in the excitation frequency range by means of an excitation radiation source device onto the detection layer in order to excite the TADF material, the excitation radiation being electromagnetic radiation, detecting TADF emission from the detection layer by means of a radiation detector device communicatively coupled to a computing device, characterized in the TADF material having a TADF emission pattern excited by the excitation radiation from the excitation radiation source device without exposure to external measurable radiation and exhibiting a different TADF emission pattern excited by the excitation radiation from the excitation radiation source device with exposure to external measurable radiation, the external measurable radiation differing from electromagnetic radiation, the TADF emission pattern with exposure to the external measurable radiation differing from the TADF emission pattern without exposure to external measurable radiation, providing detection data from the radiation detector device to the computing device, computing the detection data from the radiation detector device to determine a TADF emission pattern excited by the excitation radiation from the excitation radiation source device without exposure to external measurable radiation and a different TADF emission pattern excited by the excitation radiation from the excitation radiation source device with exposure to the external measurable radiation, the external measurable radiation differing from electromagnetic radiation, the TADF emission pattern with exposure to external measurable radiation differing from the TADF emission pattern without exposure to external measurable radiation, comparing the determined TADF emission patterns, determining, on the basis of the comparison, exposure to external measurable radiation onto the detection layer.

12. Method according to claim 11, further comprising:
controlling the operation of the excitation radiation source device by means of a control device and
emitting radiation, by operating the excitation radiation source device, in a constant emission mode and/or a variable/modifiable emission mode, comprising pulsed and/or periodical emission mode.

13. Method according to claim 11, wherein, in an excitation phase, phase excitation radiation is emitted onto the detection layer in order to excite the TADF material and, in a detection phase subsequent to the excitation phase, TADF emission from the detection layer is detected, wherein the excitation phase and the detection phase may overlap or there may be a transition phase between the excitation phase and the detection phase, during which transition phase neither excitation nor detection takes place.

14. Method according to claim 11, further comprising arranging an optical system between the detection layer and the radiation detector device for adjusting the TADF emission onto the radiation detector device.

15. Method according to claim 11, further comprising:
providing a housing, having shielding properties to shield at least one of:
electro-magnetic radiation,
X-ray radiation,
Ultraviolet radiation,
Gamma radiation,
Corpuscular radiation,
alpha radiation,
beta radiation,
neutrons
protons.

16. Method according to claim 11, further comprising at least one of
thermally calibrating the radiation detection arrangement for compensation of temperature related effects on the radiation detection device,
arrangement calibrating the radiation detection device as such for compensation of at least background radiation to which the radiation detection device is exposed.

* * * * *